United States Patent Office 3,432,972
Patented Mar. 18, 1969

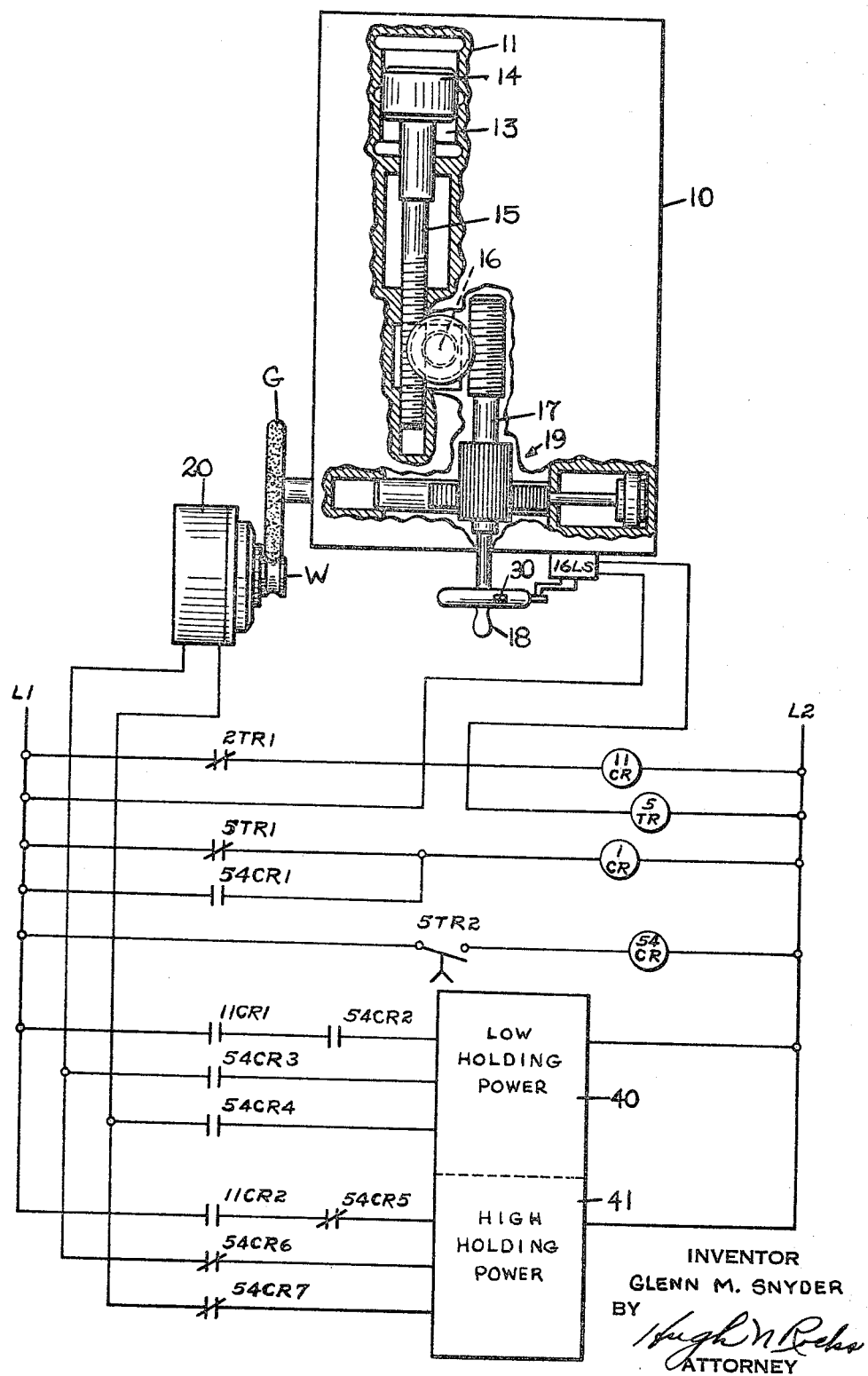

3,432,972
CONTROL MEANS FOR MAGNETIC FACE PLATES
Glenn M. Snyder, Waynesboro, Pa., assignor to Landis Tool Company, Waynesboro, Pa.
Filed Oct. 22, 1965, Ser. No. 501,417
U.S. Cl. 51—103            2 Claims
Int. Cl. B24b 5/18, 41/06, 51/00

ABSTRACT OF THE DISCLOSURE

The apparatus of this disclosure relates to grinding machines of the type generally referred to as shoe type centerless. In this machine, the workpiece is supported on angularly spaced shoes in contact with the surface being ground. The shoes support the workpiece in offset relation to the magnetic face plate which, due to the offset relation, urges the workpiece into firm contact with the shoes. The current for energizing the face plate is supplied alternately by two magnetic chuck control rectifiers, one of which is adjusted to supply high energy to the face plate, the other of which is adjusted to supply lower energy to the face plate. During the first part of the grinding operation, the grinding wheel exerts a relatively large force on the work in a horizontal direction due to the advance of the grinding wheel, and in a vertical direction due to the rotation of the grinding wheel. During this part of the grinding operation, it is necessary that the face plate exert a gripping force on the workpiece in proportion to the grinding forces acting on said workpiece. For this purpose, the face plate is connected to a high energy rectifier. These forces are gradually reduced toward the end of the grinding operation, and it is desirable to reduce the gripping force of the face plate at the same time. This is accomplished by means of a switch actuated by the feed hand wheel at the proper point in the grinding operation which disconnects the face plate from the high energy rectifier and connects it to the low energy rectifier.

---

This invention relates to grinding machines, particularly grinding machines of the type in which a workpiece is driven by a magnetic face plate and rotatably supported on peripheraly spaced supporting shoes with its axis offset from the axis of the face plate.

The purpose of this offset relation is to make use of the rotating force of the face plate to hold the workpiece against said peripherally spaced supporting shoes. Because of this offset relation, there is continuous sliding movement between the workpiece and face plate. This sliding relation is inherent in the offset relation between the face place and the workpiece. This offset relation is, in turn, necessary to hold the workpiece firmly in engagement with the supporting shoes which are the conventional means for supporting a workpiece in this type of machine.

The tendency in magnetic face plate design has been to increase the holding power of the magnet. This increase in holding power interferes with the sliding action between the face plate and workpiece. For rough grinding operations, where finish of the workpiece is of secondary importance, this interference is not harmful. In fact, a high holding power by the face plate makes possible a heavier cut during the rough grinding operation. For finish grinding, interference in the sliding relation between the face plate and workpiece has an unfavorable effect on the work finish.

It is, therefore, an object of the present invention to provide means whereby a workpiece may be held firmly for rough grinding and less firmly for finish grinding.

Another object is to provide means for adjusting the holding power of a face plate.

Another object is to change the holding power of the face plate automatically in timed relation with the change in the grinding feed rate from roughing to finishing.

The drawing is an electrical diagram showing the relation between the controls for the feed mechanism and the controls for the magnetic face plate.

Wheel support 10 is slidably mounted on base 11 for advancing and retracting movements relative to workpiece W which is rotatably supported on an electro-magnetic chuck or face plate 20.

Workpiece W may be supported on its internal surface as shown in U.S. Patent 2,694,883, granted Nov. 23, 1954, or on its external surface as shown in U.S. Patent 2,874,518, granted Feb. 24, 1959. In both cases, as in all machines of this type, the axis of the workpiece is offset with relation to the axis of the face plate in order that the rotating force of said face plate on workpiece W will hold said workpiece in firm engagement with the internal or external supporting shoes as shown in said patents.

The means for advancing and retracting grinding wheel G relative to workpiece W, is a conventional arrangement in which cylinder 13 in base 11 has a piston 14 slidably mounted therein. Piston rod 15 is in the form of a feed screw connected through a worm wheel (not identified) at the lower end of vertical shaft 16 in wheel support 10 and through a second worm wheel (not identified) at the upper end of shaft 16 in mesh with the threaded portion of hand wheel shaft 17 arranged for rotation by hand wheel 18 or by a hydraulically operated rack and pinion (not identified by numeral) of the feed actuating device 19. Such a feed mechanism is shown and described in greater detail in co-pending application, Ser. No. 491,145, filed Sept. 29, 1965.

Operation

At the beginning of a grinding operation, infeed relay 11CR is energized to advance grinding wheel G by means of infeed piston 14.

Contact 11CR1 in the circuit to magnetic chuck control rectifier 40 and contact 11CR2 in the circuit to magnetic chuck control rectifier 41, are closed.

However, contact 54CR2 in the circuit to the low energy rectifier 40 is open and said rectifier remains de-energized.

Contact 54CR5 in the circuit with contact 11CR2 is normally closed and, therefore, the high energy rectifier 41 is energized.

The feed actuating device 19 which includes a piston and rack (not identified by numerals), advances grinding wheel support 10 and grinding wheel G for a rough grinding operation by rotation of shaft 16 in said wheel support relative to the threaded portion of piston rod 15 which continues until cam 30 on hand wheel 18 actuates limit switch 16LS to energize timing relay 5TR.

During this first portion of the grinding operation, the magnetic face plate 20 is energized for high holding power by a circuit which includes normally closed relay contact 54CR5 in series with previously closed relay contact 11CR2 to energize rectifier 41 which is set to provide a relatively high current to face plate 20.

The circuit from the rectifier 41 to face plate 20 is through two lines, in one of which there is a normally closed contact 54CR6 and in the other, a normally closed contact 54CR7.

During the last part of the grinding operation, the grinding force on the work is reduced and the high holding power provided by rectifier 41 is not desirable.

After a predetermined interval, contact 5TR2 closes to energize relay 54CR for the last part of the grinding operation.

Normally closed contacts 54CR5, 54CR6 and 54CR7 open to deenergize rectifier 41.

At the same time, contact 54CR2 closes to complete a circuit through previously closed contact 11CR1 to energize rectifier 40. Contacts 54CR3 and 54CR4 close in a circuit from rectifier 40 to provide a low current to the face plate 20. The lower holding power of face plate 20 permits workpiece W to slide more freely on said face plate for the finish grinding operation with the result of a maximum degree of roundness and finish.

Rectifiers 40 and 41 are Electro-Matic Magnetic Chuck Control Model DO5VRS, Type 1R71D, made by Electro-Matic Products Company, Chicago, Ill.

I claim:
1. In a machine tool,
   (a) a tool support,
   (b) a cutting tool on said tool support,
   (c) a feed mechanism for advancing and retracting said tool support,
   (d) a work support for rotatably supporting a workpiece comprising
   (e) an electro-magnetic chuck of adjustable holding power,
   (f) means for actuating said feed mechanism to advance said cutting tool for a machining operation,
   (g) and means operable near the end of said machining operation for reducing the holding power of said chuck by maintaining the chuck electrically energized but reducing the electrical energy thereto.

2. In a machine tool,
   (a) a tool support,
   (b) a cutting tool on said tool support,
   (c) a feed mechanism for advancing and retracting said tool support,
   (d) a work support for rotatably supporting a workpiece comprising
   (e) an electro-magnetic chuck,
   (f) and means actuated by said feed mechanism for changing the holding power of said chuck by maintaining the chuck electrically energized but changing the value of electrical energy thereto at a predetermined point in the progress of a machining operation.

References Cited

UNITED STATES PATENTS

| 2,509,368 | 5/1950 | Price | 51—165.03 |
| 2,657,505 | 11/1953 | Price | 51—165.07 |
| 2,694,883 | 11/1954 | Balsiger | 51—103 |
| 2,784,534 | 3/1957 | Townsend et al. | 51—103 |
| 2,799,977 | 7/1957 | Jones et al. | 51—103 |
| 3,233,368 | 2/1966 | Price | 51—238.1 X |

DONALD R. SCHRAN, *Primary Examiner.*

G. WEIDENFELD, *Assistant Examiner.*

U.S. Cl. X.R.

51—165, 236, 238